United States Patent [19]

Charbonneau et al.

[11] Patent Number: 4,759,224
[45] Date of Patent: Jul. 26, 1988

[54] TORQUE MEASURING SYSTEM FOR MOTOR OPERATED VALVE OPERATORS

[75] Inventors: Arthur G. Charbonneau; John A. McMennamy, both of Cobb County; Steven Nafziger, Fulton County, all of Ga.

[73] Assignee: Movats Incorporated, Marietta, Ga.

[21] Appl. No.: 96,338

[22] Filed: Sep. 11, 1987

Related U.S. Application Data

[63] Continuation of Ser. No. 850,761, Apr. 11, 1986, abandoned.

[51] Int. Cl.$^4$ ............................................ G01M 19/00
[52] U.S. Cl. .................................. 73/862.31; 73/168; 73/862.27; 73/862.29; 137/552
[58] Field of Search ............... 73/168, 862.19, 862.27, 73/862.31, 862.32, 862.29; 137/552, 551; 251/129.03

[56] References Cited

U.S. PATENT DOCUMENTS

| | | | |
|---|---|---|---|
| 3,675,538 | 7/1972 | Keller et al. | 73/168 X |
| 3,946,985 | 3/1976 | Fujita et al. | |
| 4,255,967 | 3/1981 | Grymonprez et al. | 73/168 |
| 4,498,336 | 2/1985 | Dalton | 73/168 |

OTHER PUBLICATIONS

"Observed Bench Test Systems" Description of Prior Art Bench Test Systems filed by Applicant with Application: by 9-1987; 5 pages.

Primary Examiner—Tom Noland
Attorney, Agent, or Firm—Louis T. Isaf

[57] ABSTRACT

An apparatus and method for isolating certain rotating components within the operator and valve systems and artificially loading those rotating shafts to create and measure torque developed within the valve operator system; and for using the torque measurements to correlate and analyze torque in relation to other valve systems parameters.

14 Claims, 4 Drawing Sheets

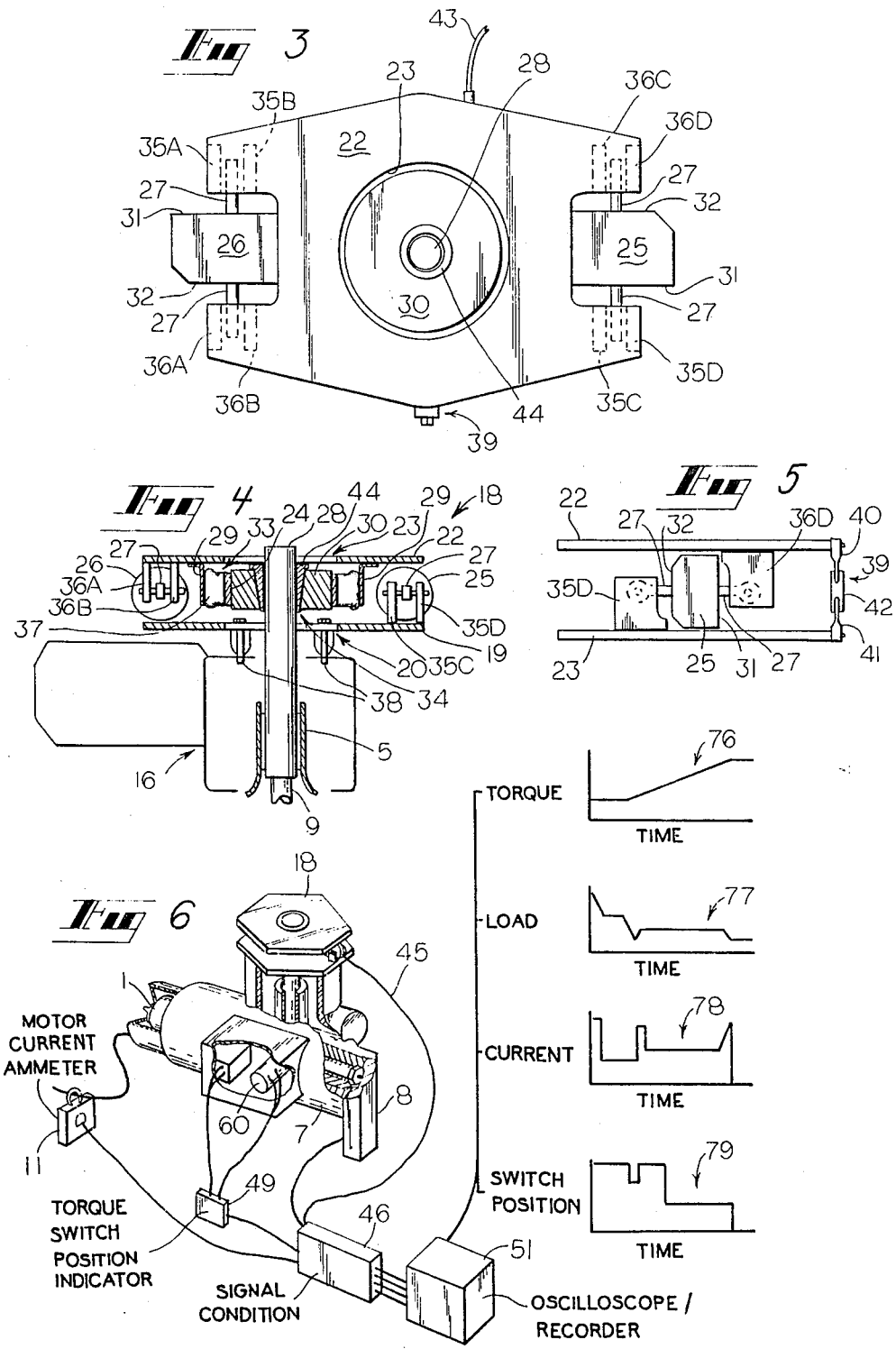

TORQUE MEASURING SYSTEM FOR MOTOR OPERATED VALVE OPERATORS

This application is a continuation of Ser. No. 850,761, filed Apr. 11, 1987, and now abandoned.

FIELD OF THE INVENTION

This invention relates generally to a system, including method and apparatus, for measuring torque in a valve operator and for testing and analysing switch settings for torque triggered safety switches in valve operators.

BACKGROUND OF THE INVENTION

Within the power industry, valves are operated remotely from open, closed and intermediate positions to improve or maintain utility power plant output, or in many cases to provide for the protection of the general public from release of radioactive materials either directly or indirectly. Continual, proper operation of these valves is essential to the well-being of the industry and the general public. The extreme emphasis on safety in nuclear power plants (and the presently bad reputation of the nuclear industry) has put a premium on the importance of maintaining proper operation of valves, of which there may be hundreds within a single plant.

At the forefront of industry attempts to monitor and maintain proper operation of these critical valves is the recent invention of Arthur G. Charbonneau, et. al. described in U.S. Pat. No. 4,542,649 (hereinafter referred to as "649"). The 649 invention disclosed a new and important valve operator monitoring system to measure, record and correlate valve stem load, limit and torque switch positions, spring pack movement and motor current providing time related information on valve performance. The information made available by the 649 patent provides a direct indication of developing valve and operator problems such as excessive or inadequate packing load, excessive inertia, proximity to premature tripping, incorrectly set operating limit and torque switches, improperly functioning thermal overload devices, inadequate or excessive stem thrust loads, gear train wear, stem damage, and load relaxation.

Although the 649 patent provides very valuable information relating to the valve operator and its surrounding systems, the 649 patent does not provide direct measurements or records as to the torque; nor does the 649 patent correlate torque measurements to other parameters within the valve operator system, such as torque switch settings, motor current and spring pack movement. Rather, in the 649 patent, the switch settings, motor current and spring pack movement are related to the thrust, also known as force or stem load, delivered by the valve operator. The 649 patent does not provide direct relationships between those important valve operator characteristics which are directly related to system torque.

Without a proper understanding of valve operator torque outputs, there is no way of verifying that the operator is providing the originally specified torque for given settings of the operator's torque tripped safety switches. Failure to provide proper, specified torque, could result from improper switch settings, physical problems with the spring pack installation or function of the spring pack or improper installation of the torque switches. If these valve operator problems remain undetected, the results could be such difficulties as breakage of a valve due to too much torque, failure of a valve to sufficiently close due to too little torque, and failure of the valve to properly react to or complete its function in an emergency situation. All of these, and othe related problems, can be extremely detrimental, especially in nuclear reactor plants.

SUMMARY OF THE INVENTION

Briefly described the present invention comprises method and apparatus for isolating certain rotating components within the operator and valve system and artifically loading those rotating components to create and measure torque developed within the valve operator system. Two embodiments of the apparatus of the present invention are disclosed herein; each embodiment being related by a similarity in the generic method of their approach to the problem. Each embodiment, however, being different in its specific structural components and its specific method of torque measuring.

A first embodiment comprises apparatus mounted directly on the operator which apparatus utilizes the existing drive sleeve spline to deliver a rotating force to the apparatus. An air brake assembly transmits the force to a fulcrum member (moment arms) which is attached to load cells. The load cells are held stationary against rotation such that rotation of the fulcrum member in reaction to the rotating force of the drive sleeve spline creates a measurable force in the load cells. Output from the load cells is transmitted to a recording device.

The apparatus of the second embodiment utilizes similar principles to the first embodiment but the apparatus is mounted at a remote operator drive, such as a quarter-turn actuator. The apparatus is mounted to the remote drive housing and utilizes the existing valve drive sleeve (with the valve, i.e. butterfly valve, removed from the sleeve) and the apparatus simulates a one-quarter turn valve. The fulcrum member (moment arm) is rotated by the valve drive spline (sleeve) until it encounters load cells which stop its rotation, thus exerting a force against the load cells. The force measured by the load cells is transmitted to a recording device.

Force detected by the load cells in either embodiment is converted to a torque figure by a calculating device. Simply explained, torque output is equal to the known load multiplied by the known moment arm. A torque/time curve is generated by the present invention. The invention further comprises apparatus for developing other time related curves for valve parameters such as the torque switch position and trip point, spring pack movement and motor current. The apparatus for generating such parameter relationships are similar to those in prior art such as the Charbonneau 649 patent.

Therefore, an object of the present invention is to provide apparatus and method for correlating the torque/time relation with the other time related valve parameters to determine important values of the particular operator being tested. Some important values and factors which can be determined as follows:

1. Output torque may be measured for any particular torque switch setting.

2. Spring pack constant may be determined to allow future correllation between torque and spring pack compression.

3. Torque switch balancing can be accomplished to give equal torque in both the open and closed direction for the same torque switch settings.

4. Output torque can be determined before operator maintenance. Then verified after reinstallation of the valve.

5. Operators can be bench tested to establish proper settings before installation. This is of paramount importance when working in high radiation areas.

6. Output torque can be determined and reestablished with a different operator should a change be required.

7. Isolation of field related operator valve problems is now greatly enhanced.

Another object of the present invention is to provide the above mentioned important parameters through the use of a portable system, which allows field testing of valves and valve operators.

Other objects, features and advantages of the present invention will become apparent upon reading and understanding specification when taken in conjunction with the accompaning drawings.

BRIEF DESCRIPTION OF THE DRAWINGS

FIG. 3 is a top view of the torque measuring apparatus in accordance with the present invention, showing the operator mounted embodiment.

FIG. 4 is a side view of the torque measuring apparatus of FIG. 3.

FIG. 5 is an end view of the torque measuring apparatus of FIG. 3.

FIG. 6 is a schematic representation showing the operator mounted torque measuring system of the present invention in relationship to other operator analysis devices and showing related parameters.

A DESCRIPTION OF THE PREFERRED EMBODIMENT

Figure 1:
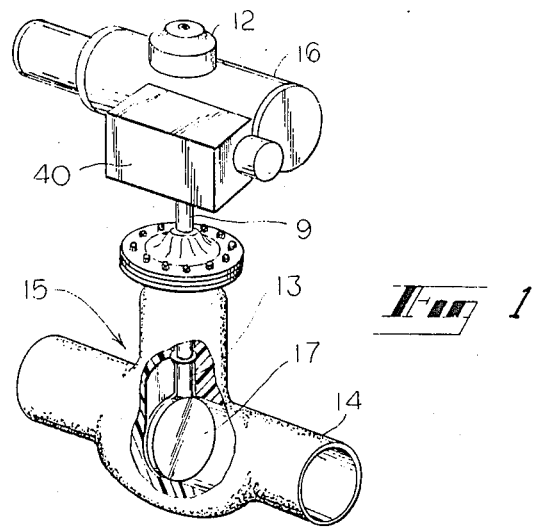
FIG. 1 is a pictorial partial view of one embodiment of a valve, valve operator and piping system in accordance with the present invention.

Referring now in greater detail to the drawings, in which like numerals represent like components throughout the different views, FIG. 1 shows the environment in which the preferred embodiments of the invention are used. A process pipe 14, having a valve assembly 15, with an attached operator 16 is within an operating system with a prescribed flow, pressure, and temperature. The valve assembly 15 is opened or closed as required for system control, and is opened or closed by the operator 16. A control circuitry box 40 is shown.

Figure 2:
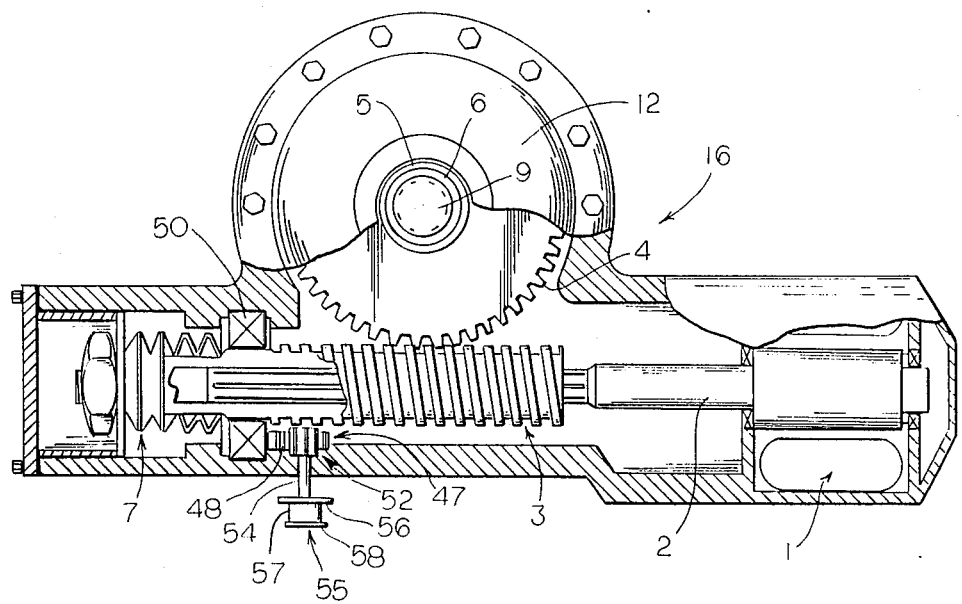
FIG. 2 is a cut-away view of one type of valve operator used in accordance with the present invention.

FIG. 2 shows a partial cut-away view of an operator 16, used in the present invention. The operator 16, is similar to operator and valve stem arrangements typically used inthe art. The motor 1 drives a worm shaft 2, which in turn drives a worm 3, which in turn drives a worm gear 4. The worm gear 4 is formed with a drive sleeve 5 into which is inserted and to which is splined a drive nut 6. The internally threaded drive nut 6 drives an externally threaded valve stem 9. The traveling valve stem 9 drives a valve drive shaft 13 to open or close the valve assembly (such as a gate valve assembly) 15. In order to absorb some of the rotating inertia of the motor and other operator components, a cluster of compression springs or spring pack 7 is provided at one end of the worm shaft 2, as shown in FIG. 2. The spring pack 7 is provided and is compressed by the worm 3 as the inertia of the system attempts to move the valve stem 5.

A toothed rack 47 is shown attached to the worm 3 for axial movement with the worm along worm shaft 2. Teeth 48 are formed in the rack 47 which is mounted to the worm 3 by a bearing connection 50. The bearing connection 50 is such that the rack 47 and toothed portion 48 do not rotate with the worm 3 but only move axially with the worm. The rack 47, as it moves back or forth with the worm 3, drives a spur gear 52 which is mounted so as to be limited to rotational movement, as known in the industry. The spur gear 52 is mounted to a bar or post 54 which post protrudes into the control box 40 where a torque switch assembly 55 is mounted to the post. The torque switch assembly 55 is of a type typical in the industry and generally includes a rear mounting plate 56 for attaching the assembly to the operator wall, a switch chamber 57 which houses the mechanical/electrical torque switches 60, a face plate 58, and switch setting screws at the face plate.

The torque measuring apparatus 18 of the present invention is shown in detail, in one of its preferred embodiments, in FIGS. 3, 4, 5 and 6. The embodiment of FIGS. 3–6 shall be termed herein as the "OPERATOR MOUNTED TORQUE MEASURING APPARATUS 18". The operator mounted torque measuring apparatus 18 is seen as comprising a lower plate member 19, having a central, circular opening 20, an upper plate member 22 having its own central, circular opening 23, two load cells 25, 26, a hollow, elongated shaft member 28, a brake drum 30, brake shoe assembly 33 and various connecting elements as described below. The brake shoe assembly 33 is rigidly mounted to the underside of the upper plate 19 and comprises a circular, shoe mounting bracket 29 attached to upper plate and oriented concentrically to the central opening 23. An expandable air bag 37 is connected to the inner face of the mounting bracket 29 and is selectively filled with air and exhausted through an air hose 43 connected to an air supply (not shown). Curved brakeshoe pads 24 are attached to the inner most face of the air bag 37.

Each of the lower plate 19 and upper plate 22 is formed with a planar profile as seen in FIG. 3. Though this planar profile is not exactly rectangular, it can be described as having four corners. The lower plate member 19 is formed with four upwardly extending load cell mounting flanges 35a–35d positioned in two of its diagonally opposed corners. The upper plate member 22 is formed with four downwardly extending load cell mounting flanges 36a–36d positioned at two of its diagonally opposed corners. With the plate members 19, 22 in their proper orientation, their relative load cell mounting flanges are oriented in opposite diagonal corners.

Assembly. When assembled for operation, the torque measuring apparatus 18 is mounted to the operator 16 by bolting to the holes where the valve stem cover 12 (See FIG. 1) has been removed. Lower plate member 19 is bolted to the operator 16, as seen in FIG. 4, by bolts 38 extending through drill holes formed in the lower plate and corresponding to the location of bolts holes in the operator. The standard drive nut 6 of the operator 16 which is typically splined to the drive sleeve 5 and internally threaded so as to engage threads of the valve stem 9, is disconnected and removed from the operator, temporarily. The hollow shaft member 28 is inserted through the central opening 20 of the lower plate member 19 to extend into the drive sleeve 5 fitting over the valve stem 9, thus replacing the original drive nut 6. The hollow shaft membr 28 differs from the drive nut 6 in that the shaft member 28 is not internally threaded and therefore does not engage the valve stem 9. However, like the drive nut 6, the hollow shaft member 28 is splined to, for rotation with, the drive sleeve 5. As seen in FIG. 4, the hollow shaft member 28 extends out of the operator 16 through the central opening 20 of the lower plate member 19 and protrudes above the lower plate member.

The upper plate member 22 is placed in alignment above the lower plate member 19 as seen in FIGS. 3-6. The upper plate member 22 and lower plate member 19 are connected together in a loose or "floating" connection by mutual connection to the two load cells 25, 26 as seen in FIG. 5. The load cells 25, 26 have eye-bolts 27 protruding from two opposite faces 31, 32. These opposite faces 31, 32 are the load sensing planes of the load cells 25, 26. One eye-bolt 27 of each load cell is pinned between the flanges of one pair of load cell mounting flanges 35, 36 of each of the upper plate member 22 and lower plate member 19. This pinning is noticeable in FIGS. 4 and 5. In addition to their "floating" connection through the load cells 25, 26, the upper plate member 22 and lower plate member 19 are connected by a flexible joint 39 comprised of peg members 40, 41 joined by a flexible sleeve 42. With the two plate members 19, 22 connected together as described above, the brake shoe assembly 33 is oriented between the planes of the two plates as seen in FIG. 4. The brake drum 30 which includes a hollow central opening 34 is place over the upper protruding end of shaft member 28, with the shaft member extending through the brake shoe element central opening 34. As seen in FIG. 4, the central opening 34 of the brake shoe element 33 is slightly tapered. A split taper bushing 44 is slid over the shaft member 28 and wedged into the central opening 34 to bind the brake shoe element 33 to the shaft member 28 for rotation and braking with the shaft member. Each of the load cells 25, 26 is connected by signal conducting cable 45 (second cable not shown) to the signal conditioner 46, as shown in FIG. 6. The function of the signal conditioner 46 is outlined below.

Operation. With the elements of the torque measuring apparatus 18 assembled and mounted on the valve operator 16 as described above, the appropriate torque measurements are taken as follows. The motor 1 is turned on to drive the gear elements of the valve operator 16. As explained above, the motor 1 drives the worm shaft 2 which drives the worm 3 which drives the worm gear 4 which drives the drive sleeve 5. The drive sleeve 5 is now splined to the hollow shaft member 28 so that the shaft member 28 rotates in continuous rotation together with the drive sleeve 5. Since the shaft member 28 is not internally threaded, it does not drive the valve stem 9 and, thus, the valve drive shaft 13 and valve assembly 15 remain idle while testing is being done by this embodiment of the apparatus 18. As the shaft member 28 rotates with the drive sleeve 5, the brake drum 30 is in continuous rotation with the shaft member 28, to which it is bound. At some point during the operation of the valve operator 16, and during the rotation of the drive sleeve 5, shaft member 28 and brake drum 30, the air brakes 33 are activated. The brake shoe pads 24 engage the brake drum 30 to lock the upper plate 22 into the same rotation as the brake drum 30, shaft member 28 and drive sleeve 5. As the upper plate 22 rotates (or attempts to rotate) the upper plate 22 pulls on, or pushes against (depending upon the direction of rotation), the eye-bolts 27 attached to the load cells 25, 26. The load cells 25, 26 are, as noted, prevented from rotating by the lower plate member 19 which is rigidly bolted to the operator housing 16.

Thus, with the air brakes engaged, the upper plate 22 functions as a force displacement arm through which a force is generated at the load cells 25,26 by the continued operation of the motor and gear system of the operator 16. The force exerted at the load cells 25, 26 is transmitted by signal, in the typical manner known in the art, to the signal conditioner 46. The purpose of the signal conditioner 46 is to provide a conditioned power supply for the load cells 25, 26; to provide local, digital readout capabilities for the load cells 25, 26; and to provide necessary sub-components for generating and delivering the output signal to the recording device 51. At the signal conditioner 46, the necessary calculating functions are performed to convert the force sensed at load cells 25, 26 to a torque measurement. Simply put, the torque is equal to the force times the moment arm; the moment arm being the distance from the rotational center of the upper plate 22 to the point at which force is exerted at the load cells 25, 26.

Thus, the torque generated in the operator 16, over a period of time, as a result of preventing rotation of the drive sleeve 5 is traced electronically and this movement is displayed on an analytical device such as an oscilloscope 51 (FIG. 5), hereinafter known generally as the recorder 51. An example of a torque-time trace, which will look different for different valves and valve conditions, is shown as curve 76 in FIG. 6.

The torque measuring apparatus 18 of the present invention operates in conjunction with a torque switch position indicator 49. This switch position indicator 49 is, preferrably, of the type disclosed in the Charbonneau 649 patent, but may be any switch position indicating device previously or hereafter developed. The purpose of the torque switch position indicator 49 is to electronically detect and record the relative on and off positions of the operator torque switch.

At the same time that the torque measurements are being taken by the torque measuring apparatus 18, the position of the torque switch 60 is also being monitored by the torque switch position indicator. It is a typical, and desired feature of a valve operator 16 that the torque switch will trip and automatically cut off the motor when the operator develops a predetermined torque. Thus, at some point during the development of torque by the torque measuring apparatus 18, as explained above, a certain torque value will be reached and the torque switch 18 will automatically turn off the motor 1. The torque switch 60 is a mechanical switch housed within the switch chamber 57 of the torque switch assembly 55 (see FIG. 2). The torque switch is not intelligent and does not know what torque value is actually generated by the operator. Rather, the switch 60 simply "trips" after a predetermined amount of rotation of the spur gear 52 and bar 54. The torque switch face plate is marked with calibrated settings, for example "1", "2", etc. Ideally, the valve manufacturer will say that, for example, setting number "2" corresponds to 500 ft. lb. of torque. These "ideal" matchings of torque to switch setting do not always hold true, for one reason or another, when the operator 16 is in the field. By utilizing the present invention, the user can determine the exact, true torque value at the time when the torque switch 60 trips. In addition to other advantages of the present invention, it can be seen that the user is able to calibrate the torque switch face plate 58 settings to true values of torque.

Figure 7:
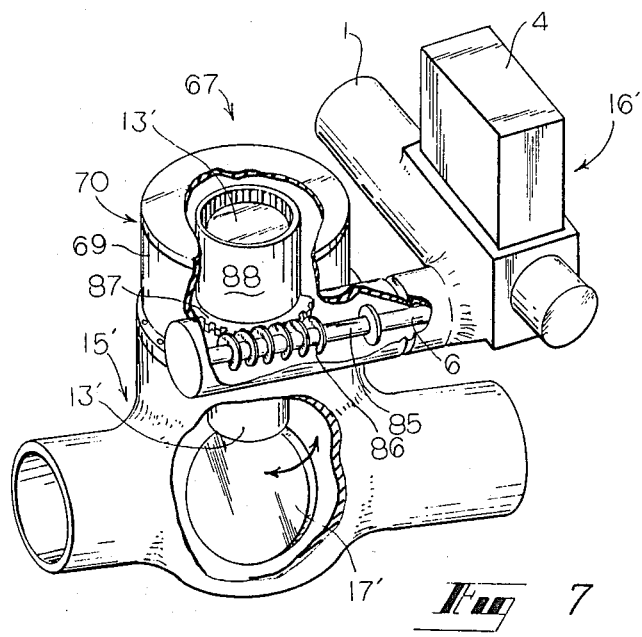
FIG. 7 is a pictorial partial view of one embodiment of a remote operator drive used in accordance with the present invention.
Figure 8:
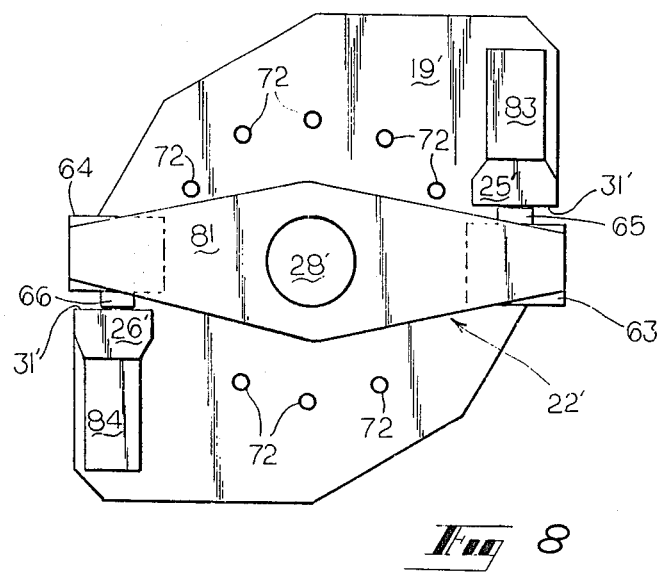
FIG. 8 is a bottom view of the torque measuring apparatus in accordance with the present invention, showing the remote drive mounted embodiment.
Figure 9:
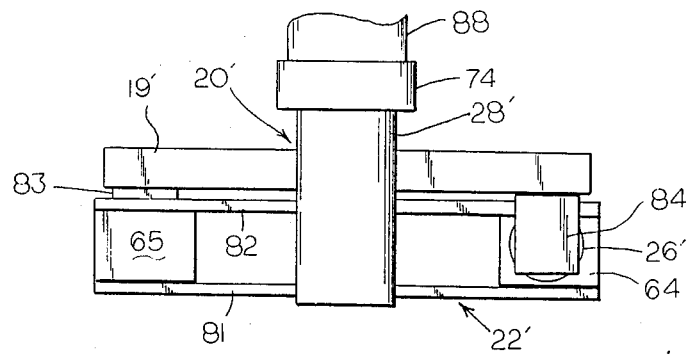
FIG. 9 is a side view of the torque measuring apparatus of FIG. 7.
Figure 10:
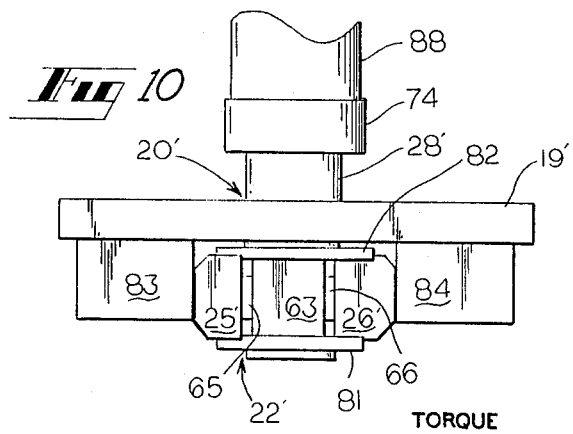
FIG. 10 is an end view of the torque measuring apparatus of FIG. 7.
Figure 11:
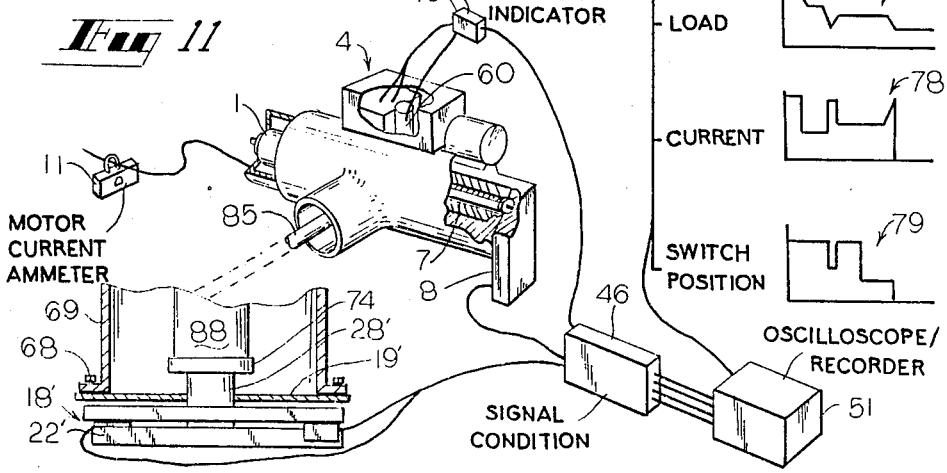
FIG. 11 is a schematic representation showing the remote drive mounted torque measuring system of the present invention in relationship to other operator analysis devices and showing related parameters.

Another embodiment of the torque measuring apparatus 18 of the present invention is shown in detail in FIGS. 8-10, and shall be termed the "REMOTE DRIVE MOUNTED TORQUE MEASURING APPARATUS 18'". This embodiment is used in the environment of a remote drive 67, as for example, the quarter-turn actuator 67 of FIG. 7. As seen in FIGS. 8-10, the remote drive embodiment of the torque measuring apparatus 18' comprises a mounting plate 19' formed with a circular, central opening 20'. Two load cells 25',26' are mounted in a fixed manner to blocks 83, 84 which are in turn mounted in fixed manner to the mounting plate 19' with the load cells at a predetermined radial distance from the center of the central opening 20'. The load cells 25', 26' are oriented with their force sensitive planes 31' parallel to one another, approximately 180 degrees off-set from one another and facing in opposite linear directions (the same rotational direction). This is better understood by viewing FIG. 8. The torque measuring apparatus 18' further comprises a shaft member 28' and a fly-arm member 22' attached rigidly to the end of the shaft member. Hammer members 63, 64 are mounted at opposite ends of the fly-arm member 22', displaced approximately 180 degrees from one another. Strike heads 65, 66 extend from the hammer members 63, 64 at a distance from the center point of the shaft member 28' which distance is approximately equal to the distance of the load cell force sensitive faces 31' from the center point of the central opening 20'. The strikeheads 65, 66 face in opposite linear directions (the same rotational directions). As can be seen, the fly-arm member 22' of the preferred embodiment is comprised of two plates 81, 82 and the hammer members 63, 64 are connected between the two plates to form the rigid fly-arm member.

The remote drive 67, of the embodiment of FIG. 7, is shown as a quarter-turn gear operator 70 (such as a LIMITORQUE ® HBC gear operator) driven by a motor operated valve operator 16' (such as a LIMITORQUE ® SMB-0 operator). The valve operator 16' is comprised of the motor 1, worm shaft 2, worm 3, worm gear 4, drive sleeve 5, spring pack 7 and drive nut 6, all of which are arranged and interact as described with respect to FIG. 2 above. In the case of the remote drive 67, the drive nut 6 is not internally threaded, but is bored and keyed to the remote shaft 85. Remote shaft 85 drives a remote worm 86, which drives a quarter-turn worm gear 87. The worm gear 87 is formed with a remote drive sleeve 88 which is internally splined. When in place over the valve assembly 15', the remote valve drive shaft 13' is inserted into and in splined connection with the remote drive sleeve 88. The valve drive shaft 13' rotates withthe drive sleeve to open and close a quarter-turn valve element (such as a butterfly valve) 17'.

Assembly. The remote drive embodiment of the torque measuring apparatus 18' is assembled and mounted at the location of the remote drive 67 as described hereafter, with reference to FIGS. 7-9. At the location of the remote drive 67, the valve assembly bolts 68 are removed and the remote drive 67 is lifted away from the valve assembly 15'. The valve drive shaft 13' and valve element 17' are then disconnected from the remote drive sleeve 88. The mounting plate 19' is then bolted rigidly to the remote drive housing 69 by the bolts 68 extending through bolt holes 72 formed in the mounting plate 19', corresponding to the bolt hole locations in the housing 69. The central opening 20' of mounting plate 19' is in alignment with the remote drive sleeve 88 passage. Shaft member 28', to which the fly-arm member 22' is attached, is inserted through the central opening 20' and into the remote drive sleeve 88; and is connected to the drive sleeve 88 by a spline adapter 74; whereby the shaft member 28' and remote drive sleeve 88 will rotate as a unit. The elements, when assembled, are so designed such that the strike heads 65, 66 of the fly-arm member 22' lie in the same plane as the force sensitive planes 31' of the load cells 25', 26'.

Operation. The remote drive mounted torque measuring apparatus 18', when assembled as above, simulates the typical quarter-turn radius of a valve element 17', such as a butterfly valve. To measure the systems torque using the remote drive mounted embodiment 18', the user turns on the operator motor 1, which, again, drives worm shaft 2, which drives worm 3, which drives worm gear 4, which drives drive sleeve 5, which drives drive nut 6, which drives remote shaft 85, turns remote drive sleeve 88. As the remote drive sleeve 88 rotates, shaft member 28' is rotated by virtue of the above-explained connection. As the shaft member 28' rotates, it, in turn, rotates the fly-arm member 22'. The fly-arm member 22' continues to rotate until the hammer members 63, 64 are blocked from continued rotation by engagement with the load cells 25', 26' which are held stationary by the bolted mounting plate 19'. As contact is made, the strikeheads 65, 66 engage the force sensative planes 31' of the load cells 25', 26'. Thus, the fly-arm member 22' functions as a force displacement arm through which a force is generated at the load cells as the motor 1 continues to work and attempt to drive the operator gear systems.

The force generated at the load cells 25', 26' is detected and communicated to the signal conditioner 46. The signal conditioner uses the load signal to calculate the true torque generated at the remote gear operator 70 in a manner similar to that expressed with respect to the operator mounted torque measuring apparatus 18, above. Thus, the torque at the remote gear operator 70 is traced electronically and this time related torque trace is displayed on an analytical device such as the recorder 51, in a manner similar to that described above with respect to the operator mounted embodiment 18. Once this time related torque trace 76' is deterined, the torque is correlated and analyzed in relation to the torque switch position in a manner similar to that described above in relation to the operator mounted embodiment 18.

In the most preferred embodiments of the present invention, the torque measuring apparatus 18 is utilizedd in conjunction with the full range of elements disclosed in the Charbonneau 649 patent. In this way, the torque-time curves generated by the present invention are used to add yet another time related parameter to the interrelationships of the 649 patent, giving even greater correlation and analysis abilities to the person testing the valve operators. The interrelationship between the current measuring device 11, torque switch position indicator 49 and limit switch position indicator 49 and spring pack movement detecting device 8 is shown in FIG. 6 by reference to the time related parameter curves 76, 77, 78, 79. The interrelationship of the parameters and their values is best understood by reference to the Charbonneau 649 patent.

Whereas this invention has been described in detail with particular reference to preferred embodiments thereof, it will be understood that variations and modifications can be effected within the spirit and scope of the invention, as described herein before and as defined in the appended claims.

We claim:

1. Method of testing and analyzing proper switch settings for torque triggered safety switches in valve operators and other load driving systems including a load driving shaft which rotates to drive a load, thus developing a torque, and including a torque triggered safety switch for the purpose of shutting down the motor when torque has reached a predetermined point, said method comprising the steps of:
   connecting a load displacing arm, at least temporarily, to the load driving shaft for rotation with the shaft;
   rotating the shaft and load displacing arm by operation of a shaft driving means;
   stopping rotation of the shaft by blocking rotation of the load displacing arm with a blocking means while the shaft driving means continues to seek rotation of the shaft;
   measuring by force measuring means the force exerted over a period of time by the load displacing arm upon the blocking means;
   generating a force/time curve;
   converting by calculating means the force/time curve to a torque/time curve;
   detecting the point in time at which the torque triggered safety switch shuts down the motor;
   tracking the open and close position of the safety switch to generate a switch position/time curve; and
   correlating the torque/time and switch position/time curves to provide an interrelated time relationship between the system torque and safety switch operation.

2. Method of testing and analyzing safety switch performance for torque triggered safety switches in valve operators and other motor driven systems having a load driving shaft which is rotated to drive a load, thus developing a torque, and having a torque triggered safety switch for the purpose of shutting down the motor when torque has reached a predetermined point, said method comprising the steps of:
   replacing the load with means for selectively creating a counter rotation force on the load driving shaft;
   rotating the load driving shaft by operation of the motor;
   creating the counter-rotation force on the load driving shaft, thus developing a torque in the system;
   measuring the torque so developed in the system over a period of time;
   detecting the point in timat at which the torque triggered safety switch shuts down the motor; and
   providing a correlated, interrelated time relationship between the system torque and safety switch operation.

3. Method of claim 2, further comprising the steps of:
   generating a torque/time curve;
   generating a switch position/time curve; and
   recording the respective curves.

4. Method of determining and evaluating the general material and operational condition of a valve operator, having a driven worm shaft, which drives a worm which in turn drives a worm gear for driving a valve stem to open and close a valve attached to the valve stem, having a motor for effecting driving of the worm shaft, and having a torque triggered switch for the purpose of shutting down the motor when torque developed within the operator has reached a predetermined point, said method comprising the steps of:
   operating the valve operator over a period of time;
   creating a counter-rotation force to counter the rotation of the worm gear, thus developing a torque in the system;
   monitoring the torque so developed in the system over the period of time;
   providing a torque/time curve;
   monitoring the torque switch position over the same period of time;
   providing a switch position/time curve; and
   correlating the torque/time and switch position/time curves to provide an interrelated time relationship between the system torque and switch operation.

5. Method of claim 4, further comprising the steps of:
   recording the respective curves; and
   diagnosing the correlated curves to evaluate the condition of the valve operator.

6. Method of determining and evaluating the general material and operational condition of a valve operator, having a driven worm shaft, which drives a worm which in turn drives a worm gear for driving a valve stem to open and close a valve attached to the valve stem, having a motor for effecting driving of the worm shaft, and having a torque triggered switch for the purpose of shutting down the motor when torque developed within the operator has reached a predetermined point, said method comprising the steps of:
   operating the valve operator over a period of time;
   creating a counter-rotation force to counter the rotation of the worm gear, thus developing a torque in the systems;
   measuring the counter rotation force over the period of time;
   providing a force/time curve;
   monitoring the torque switch position over the same period of time;
   providing a switch position/time curve; and
   correlating the force/time and switch position/time curves to provide an interrelated time relationship between the counter rotation force and the switch position.

7. Method of claim 6, further comprising the steps of:
   converting by calculating means the force/time curve to a torque/time curve; and
   correlating the torque/time and switch position/time curves to diagnose and evaluate the operation of the valve operator.

8. Method of determining and evaluating the general material and operational condition of a valve operator, having a driven worm shaft, which drives a worm which in turn drives a worm gear for driving a valve stem in a rotating fashion to open and close a valve attached to the valve stem, having a motor for effecting driving of the worm shaft, and having a torque triggered switch for the purpose of shutting down the motor when torque developed within the operator has reached a predetermined point, said method comprising the steps of:

connecting a load displacing arm, at least temporarily, to the valve stem for rotation with the stem;

operating the valve operator over a period of time to drive the valve stem in a rotating fashion, whereby the valve stem rotates about its longitudinal axis;

stopping rotation of the valve stem by blocking rotation of the load displacing arm with a blocking means while the worm gear continues to seek rotation of the valve stem, and measuring by force measuring means the force exerted over the period of time by the load displacing arm upon the blocking means;

generating a force/time curve;

monitoring at least one other operator parameter over the same period of time, which other parameter is one of motor current, torque switch position, or limit switch position;

providing a time related curve of the other parameter; and correlating the time curves to evaluate the operation of the valve operator.

9. Method of determining and evaluating the general material and operational condition of a valve operator, having a driven worm shaft, which drives a worm which in turn drives a worm gear for driving a valve stem to open and close a valve attached to the valve stem, having a motor for effecting driving of the worm shaft, and having a torque triggered switch for the purpose of shutting down the motor when torque developed within the operator has reached a predetermined point, said method comprising the steps of:

operating the valve operator over a period of time;

monitoring torque developed within the valve operator;

providing a time related trace of torque developed within the valve operator over the period of time;

monitoring at least one other operator parameter over the same period of time, which other parameter is one of motor current, torque switch position or limit switch position;

providing a time related trace of the other parameter; and correlating the time related traces of the torque and other parameter to evaluate the operation of the valve operator.

10. Method of determining and evaluating the general material and operational condition of a valve operating system, which operating system includes a worm gear mounted for rotation about an axis of rotation, which worm gear is driven by rotational forces perpendicular to the axis of rotation and delivers rotational forces perpendicular to the axis of rotation to effect driving of a valve stem, and which operating system also includes a motor which includes a drive mechanism to provide the rotational forces for driving the worm gear, and further includes a torque triggered switch for the purpose of shutting down the motor when torque developed within the system has reached a predetermined point, and a limit switch, said method comprising the steps of:

operating the motor over a period of time to drive the worm gear;

loading the worm gear;

monitoring rotational force acting on the worm gear over the period of time;

providing a rotational force/time trace;

monitoring at least one other parameter over the same period of time in which the other parameter is one of motor current, torque switch position or limit switch position;

providing a parameter/time trace of the other parameter; and correlating the rotational force/time trace and the other parameter/time trace to provide an interrelated time relationship between the rotational force and the other parameter.

11. Method of claim 10, further comprising the steps of:

converting the rotational force/time trace to a torque/time trace; and correlating the torque/time and other parameter/time traces to evaluate the valve operating system.

12. Method of claim 11, further comprising the steps of recording the respective traces.

13. Method of determining and evaluating the general material and operational condition of a valve operator, having a driven worm shaft, which drives a worm which in turn drives a worm gear for driving a valve stem to open and close a valve attached to the valve stem, having a motor for effecting driving of the worm shaft, and having a torque triggered switch for the purpose of shutting down the motor when torque developed within the operator has reached a predetermined point, said method comprising the steps of:

operating the valve operator over a period of time;

creating a counter-rotation force to counter the rotation of the worm gear, thus developing a torque in the systems;

measuring the counter rotation force over the period of time;

deriving torque from the measured rotational force;

providing a torque/time curve;

monitoring the torque switch position over the same period of time;

providing a switch position/time curve; and correlating the force/time and switch position/time curves to provide an interrelated time relationship between the counter rotation force and the switch position.

14. Method of determining and evaluating the general material and operational condition of a valve operating system, which operating system includes a worm gear mounted for rotation about an axis of rotation, which worm gear is driven by rotational forces perpendicular to the axis of rotation and delivers rotational forces perpendicular to the axis of rotation to effect driving of a valve stem, and which operating system also includes a motor which includes a drive mechanism to provide the rotational forces for driving the worm gear, and further includes a torque triggered switch for the purpose of shutting down the motor when torque developed within the system has reached a predetermined point, and a limit switch, said method comprising the steps of:

operating the motor over a period of time to drive the worm gear;

loading the worm gear;

monitoring rotational force acting on the worm gear over the period of time;

deriving the torque on the worm gear;

providing a torque/time trace;

monitoring at least one other parameter over the same period of time in which the other parameter is one of motor current, torque switch position or limit switch position;

providing a parameter/time trace of the other parameter; and correlating the rotational force/time trace and the other parameter/time trace to provide an interrelated time relationship between the rotational force and the other parameter.

* * * * *